(12) United States Patent
Sheiman

(10) Patent No.: US 8,977,503 B2
(45) Date of Patent: Mar. 10, 2015

(54) METHOD FOR STABILIZATION OF LOW FREQUENCIES IN TAU-P DOMAIN FILTERING AND DECONVOLUTION

(75) Inventor: Jonathan Lewis Sheiman, Houston, TX (US)

(73) Assignee: Shell Oil Company, Houston, TX (US)

( * ) Notice: Subject to any disclaimer, the term of this patent is extended or adjusted under 35 U.S.C. 154(b) by 816 days.

(21) Appl. No.: 13/260,979

(22) PCT Filed: Mar. 31, 2010

(86) PCT No.: PCT/US2010/029368
§ 371 (c)(1),
(2), (4) Date: Apr. 30, 2012

(87) PCT Pub. No.: WO2010/120505
PCT Pub. Date: Oct. 21, 2010

(65) Prior Publication Data
US 2012/0209531 A1     Aug. 16, 2012

Related U.S. Application Data

(60) Provisional application No. 61/165,135, filed on Mar. 31, 2009.

(51) Int. Cl.
G01V 1/00 (2006.01)
G01V 1/32 (2006.01)
G06F 11/30 (2006.01)

(52) U.S. Cl.
CPC .............. *G01V 1/32* (2013.01); *G01V 2210/47* (2013.01)
USPC ............... 702/17; 702/18; 702/182; 702/188; 702/190

(58) Field of Classification Search
CPC ...... G01V 1/32; G01V 1/364; G01V 2210/32
USPC ..................... 702/17, 18, 182–190
See application file for complete search history.

(56) References Cited

U.S. PATENT DOCUMENTS

| | | | |
|---|---|---|---|
| 4,760,563 A | 7/1988 | Beylkin | 367/73 |
| 4,884,248 A * | 11/1989 | Laster et al. | 367/73 |
| 5,587,965 A | 12/1996 | Dragoset, Jr. et al. | 367/24 |
| 6,763,304 B2 | 7/2004 | Schonewille | 702/14 |
| 6,834,236 B2 | 12/2004 | Iranpour | 702/17 |
| 8,730,761 B2 * | 5/2014 | Ferber | 367/21 |

* cited by examiner

*Primary Examiner* — Phuong Huynh

(57) ABSTRACT

Apparatuses and methods for collecting and analyzing seismic data (D) include a frequency dependent noise factor ($\epsilon_2$) for stabilizing a transformation matrix (S). The noise factor ($\epsilon_2$) is a function of a number of nonzero eigenvalues of the transformation matrix (S).

15 Claims, 4 Drawing Sheets

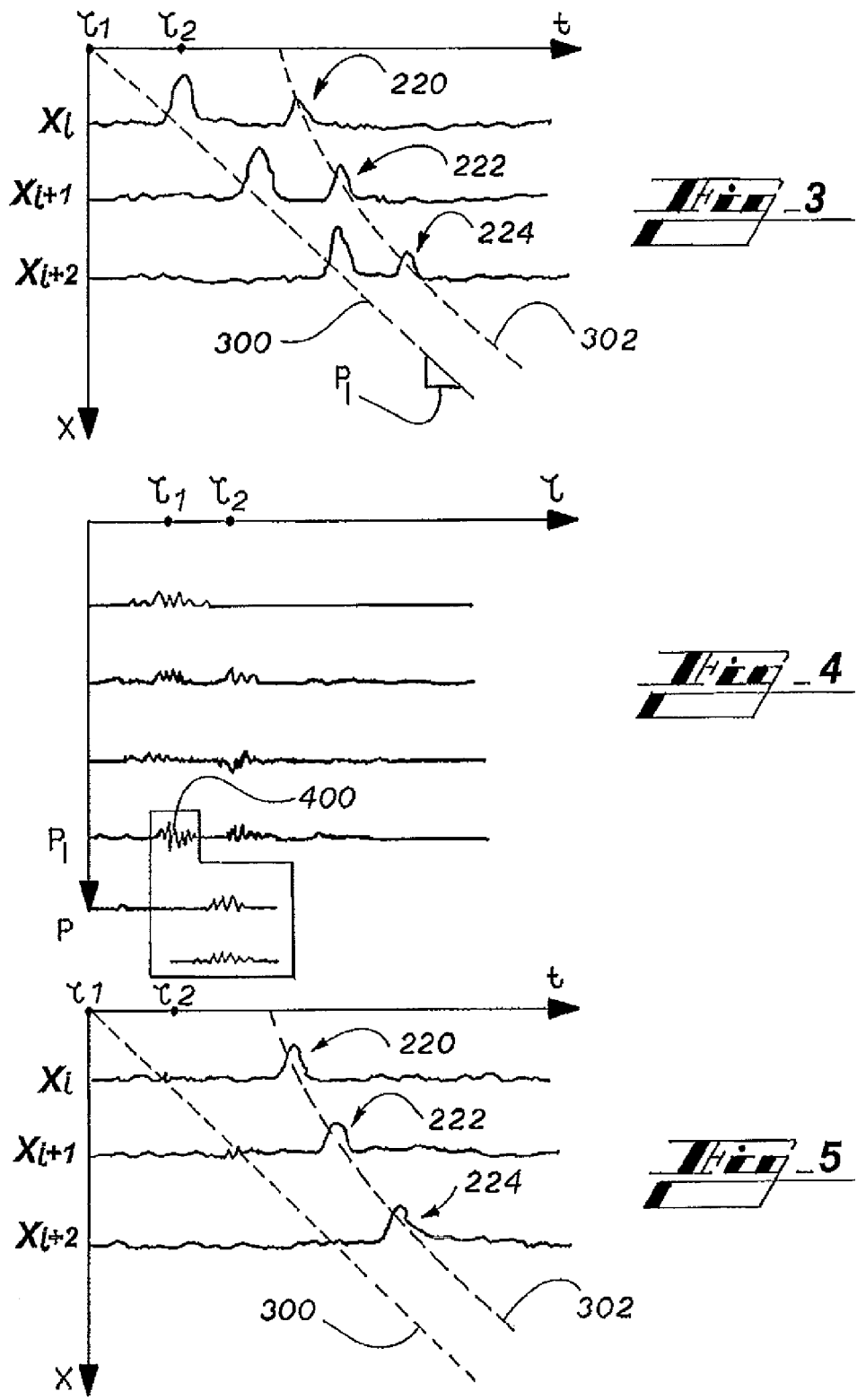

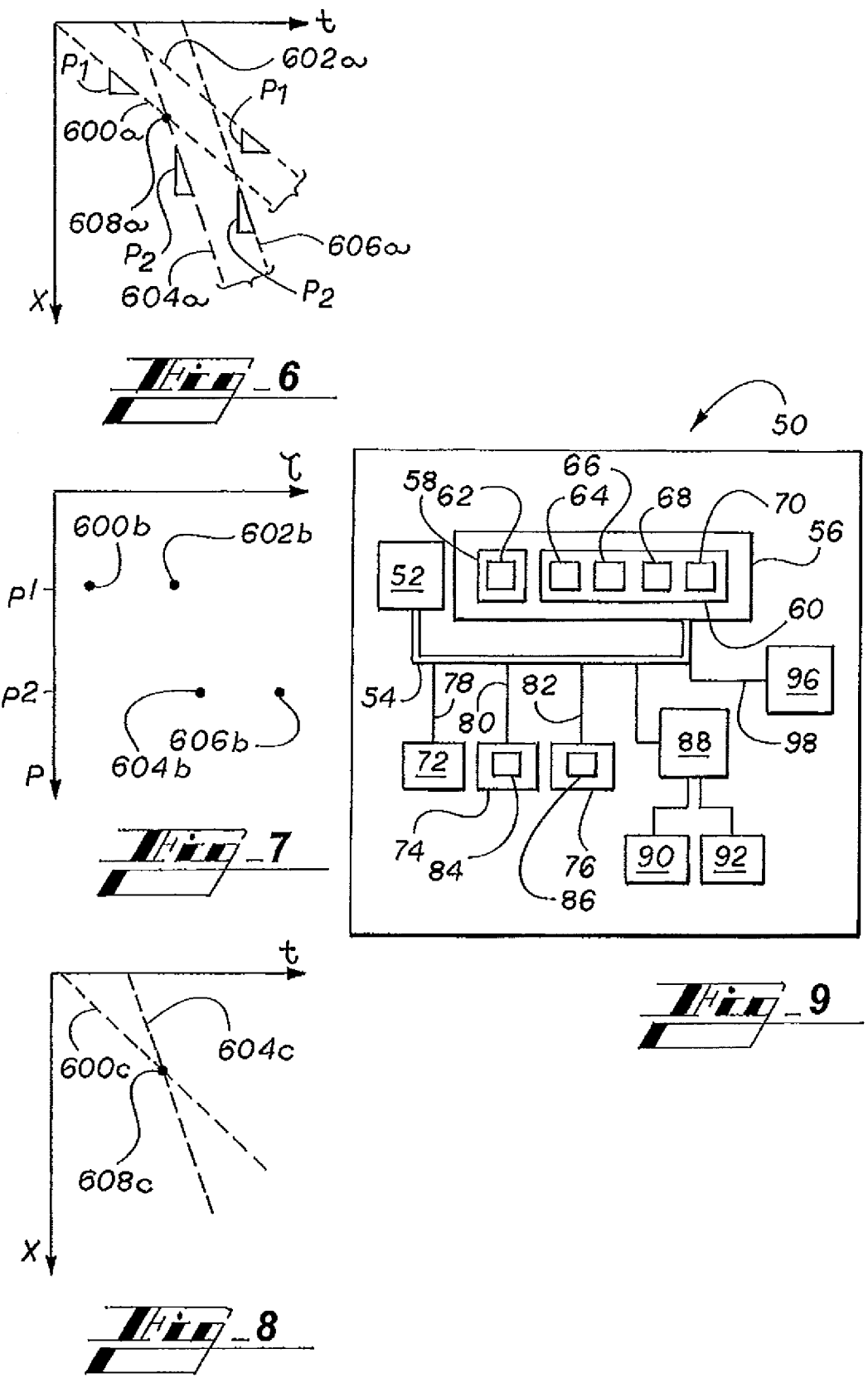

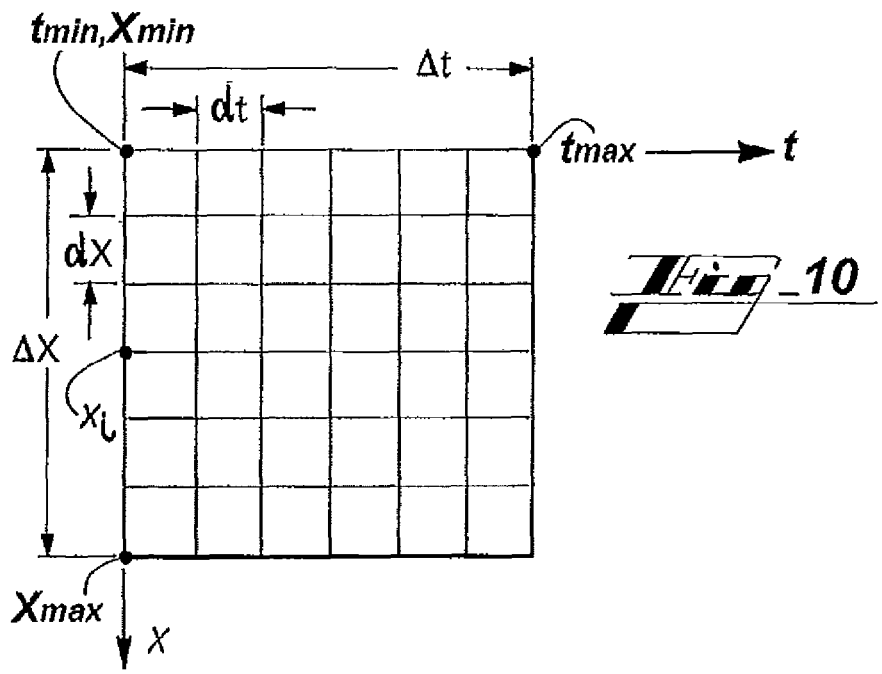
Fig._10
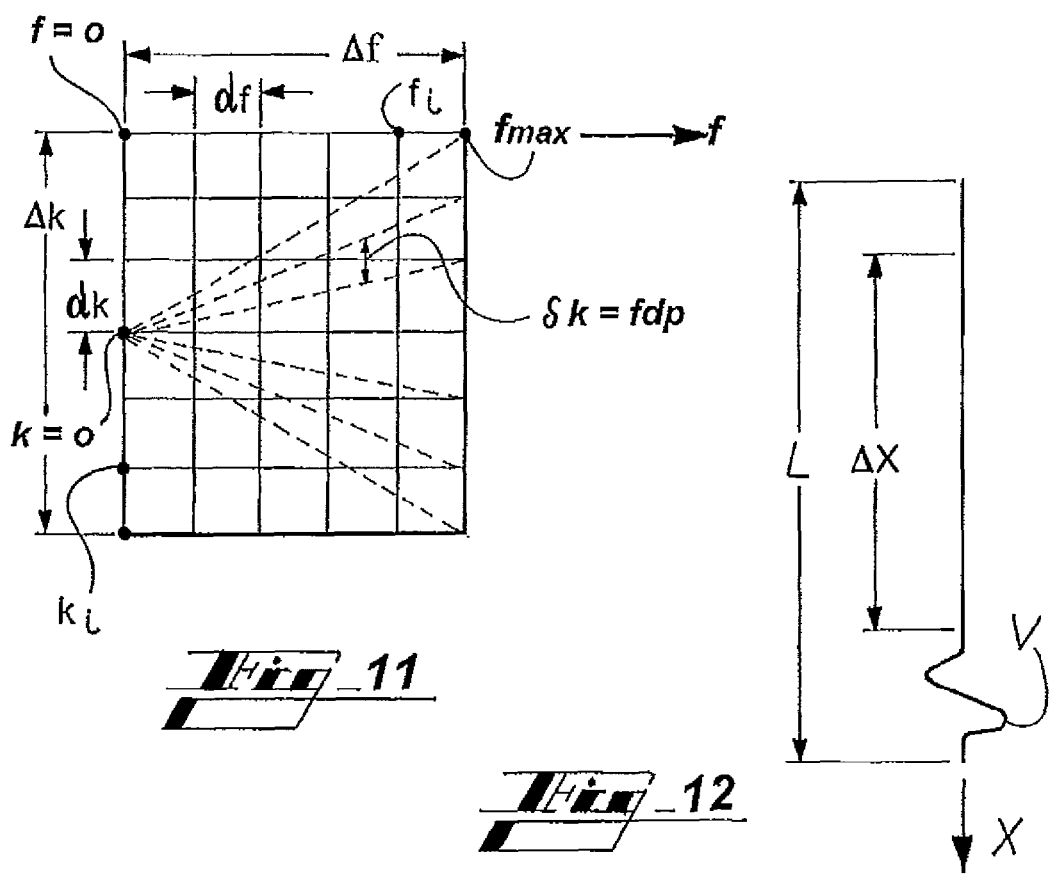
Fig._11
Fig._12

METHOD FOR STABILIZATION OF LOW FREQUENCIES IN TAU-P DOMAIN FILTERING AND DECONVOLUTION

RELATED CASES

This application is a national filing under 35 USC §371 of international application PCT/US2010/029368, filed on 31 Mar. 2010, which claims benefit of U.S. application Ser. No. 61/165,135, filed on 31 Mar. 2009, both of which are incorporated herein by reference.

TECHNICAL FIELD

This disclosure relates generally to apparatuses and methods for transforming a seismogram.

BACKGROUND

Seismograms are commonly transformed into tau-p space to facilitate processing, filtering, deconvolution, and the like. The inversion method used to calculate the transformated data becomes unstable at low frequencies. The artifacts from this instability lead to undesired effects after tau-p domain processing and transformation back to the time-distance domain. Furthermore, current implementations of the transformation lead to a transform domain which is artificially poor in sampling in the low frequencies.

A previous solution has been to attempt to stabilize the inversion by the use of a standard, frequency independent noise factor. However, such a noise factor does not attack the problem with sufficient specificity, and the instability remains. The spectral imbalance of the transform domain has simply been tolerated, even though it has deleterious effects on some transform domain processes such as deconvolution. Therefore, a heretofore unaddressed need exists in the industry to address the aforementioned deficiencies and inadequacies.

SUMMARY

The various embodiments of the present disclosure overcome the shortcomings of the prior art by providing an apparatus and method for transforming a seismogram into tau-p space. According to one aspect, apparatuses and methods for transforming seismic data include a frequency dependent noise factor for stabilizing a transformation matrix. According to an exemplary embodiment, time-offset seismic data D is collected with one or more sensors at a plurality of sensor positions in a range along a dimension of a formation by sensors. As such, the time-offset seismic data D represents the formation. The time-offset data is Fourier transformed into frequency-offset seismic data D. A method of transforming frequency-offset seismic data D into tau-p space includes steps that are performed at each frequency. One step is generating frequency dependent transformation matrices R that are configured to transform frequency-offset seismic data D into tau-p seismic data A according to $A=(R^+R)^{-1}R^+D$. Another step is generating an estimate of the number of nonzero eigenvalues or diagonal elements of the transformation matrix $R^+R$ where the number of nonzero eigenvalues is a function of frequency. Subsequently, an invertible transformation matrix X is created as a noise factor is factored into the transformation matrix $R^+R$. The noise factor is a function of the number of nonzero eigenvalues. The frequency-offset seismic data D is then transformed into tau-p seismic data A according to $A=(X)^{-1}R^+D$.

According to an exemplary embodiment, the number of nonzero eigenvalues is further a function of the range of sensor positions and of a p-domain sampling interval. Further, the noise factor is a function of the sum of the eigenvalues of transformation matrix $R^+R$ divided by the number of nonzero eigenvalues. Alternatively described, the noise factor is substantially proportional to the average of the non-zero eigenvalues of transformation matrix $R^+R$.

According to an exemplary embodiment, for example where the seismic data includes curved events, the method further includes multiplying tau-p seismic data A by the square root of a derivative operator. Seismic data can include curved events, for example when the seismic data is collected at sensor positions located in a range along the surface of the formation.

The foregoing has broadly outlined some of the aspects and features of the present disclosure, which should be construed to be merely illustrative of various potential applications. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

DESCRIPTION OF THE SEVERAL VIEWS OF THE DRAWINGS

FIGS. 3-5 are graphical illustrations of an exemplary method of processing a seismogram generated by the apparatus of FIG. 2.

FIGS. 6-8 are graphical illustrations of exemplary transformations between time-offset space and tau-p space.

FIG. 9 is a schematic illustration of an exemplary computing environment of the apparatuses of FIG. 1 and FIG. 2.

FIG. 10 is a schematic illustration of an exemplary seismogram in time-offset space.

FIG. 11 is a schematic illustration of an exemplary seismogram in frequency-wavenumber space.

FIG. 12 is a schematic illustration of a wavelet with respect to a range of data sampling positions and a spatial period.

DETAILED DESCRIPTION

As required, detailed embodiments are disclosed herein. It must be understood that the disclosed embodiments are merely exemplary and that the teachings of the disclosure may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The disclosure includes exemplary data collection techniques and exemplary methods that can be used to process the data collected by these and other various techniques. Disclosed data collection techniques include vertical seismic profiling (VSP) and surface seismics.

Vertical Seismic Profiling

Figure 1:
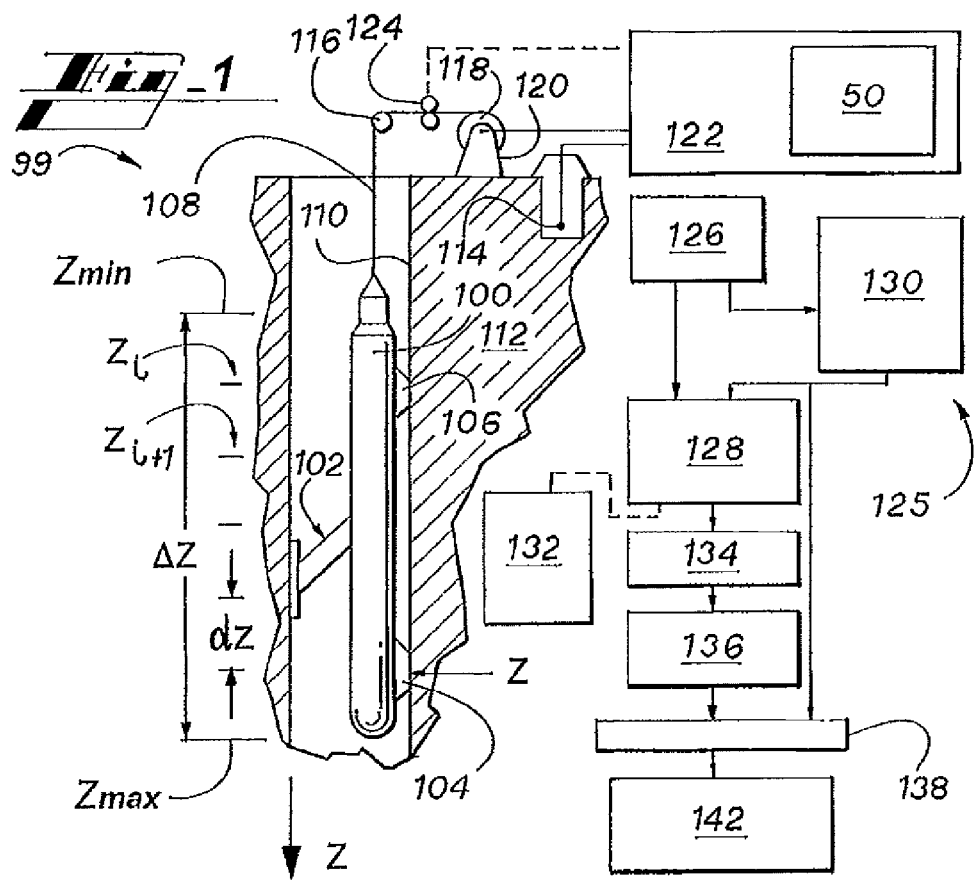
FIG. 1 is a schematic illustration of an apparatus for vertical seismic profiling exploration and a method for processing seismic data, according to a first exemplary embodiment.

Referring to FIG. 1, a first apparatus 99 is described. The apparatus 99 includes a tool 100 suitable for VSP exploration that is configured to be lowered on an armored multiconductor cable 108 into a borehole 110 to take VSP measurements of a subspace formation 112. Tool 100 is configured for movement up and down borehole 110 and includes a pivoted, power-driven clamping arm 102, receiver pads or geophones 104, 106, and various internal subsystems. Tools of this type are described, for example, in U.S. Pat. No. 4,527,260. The geophone 104 is clamped against the wall of borehole 110 at a borehole depth z by arm 102 and measures seismic energy originating at a seismic source 114. These measurements are digitized by circuitry (not shown) in tool 100 and the result is sent up via conductors within armored cable 108. Cable 108 goes to a sheave wheel 116 at the surface, and then to a suitable drum-and-winch mechanism 118 which raises and lowers tool 100 in borehole 110 as desired so that geophone 104 can be clamped at a succession of depths z. Electrical connections between tool 100 and surface equipment are made through a suitable multi-element slip-ring-and-brush contact assembly 120. A surface unit 122 contains tool control and preprocessing equipment which communicates with tool 100 via cable 108, and with seismic source 114 via another cable. Cable 108 also runs through a measuring wheel unit 124 which provides signals indicative of the current borehole depth z of geophone 104. These depth signals are recorded at surface unit 122 such that a given set of outputs of the geophone 104 can be associated with a respective depth z in borehole 110.

The surface unit 122 includes an exemplary environment for implementing the methods described herein in or through use of a personal computer (PC). For example, methods described herein may be implemented through an application program running on an operating system of a PC. Methods described herein also may be practiced with other computer system configurations, including hand-held devices, multi-processor systems, microprocessor based or programmable consumer electronics, mini-computers, mainframe computers, etc.

The application program may include routines, programs, components, data structures, etc. that implement certain abstract data types, perform certain tasks, actions, or tasks. In a distributed computing environment, the application program (in whole or in part) may be located in local memory, or in other storage. In addition, or in the alternative, the application program (in whole or in part) may be located in remote memory or in storage to allow for the practice of the methods where tasks are performed by remote processing devices linked through a communications network.

Referring to FIGS. 1 and 9, a PC 50 includes a processor 52 (also referred to as a processing means or processing unit) joined by a system bus 54 to a memory 56 (also referred to as system memory). The memory 56 may include read only memory (ROM) 58 and random access memory (RAM) 60. The ROM 58 stores the basic input/output system 62 (BIOS), which contains basic routines that aid in transferring information between elements within the PC 50 during start-up, and at other times. The RAM 60 may store program modules and drives. In particular, the RAM 60 may include an operating system 64, one or more application programs 66, outline fonts 68, program data 70, a web browser program (not illustrated), etc.

The PC 50 also may include a plurality of drives interconnected to other elements of the PC 50 through the system bus 54 (or otherwise). Exemplary drives include a hard disk drive 72, a magnetic disk drive 74, and an optical disk drive 76. Specifically, each disk drive may be connected to the system bus 54 through an appropriate interface (respectively, a hard disk drive interface 78, a magnetic disk drive interface 80, and an optical drive interface 82). Further, the PC 50 may include non-volatile storage or memory through the drives and their associated computer-readable media. For example, the magnetic disk drive 74 allows for the use of a magnetic disk 84; and the optical disk drive 76 allows for the use of an optical disk 86. Other types of media that are readable by a computer, e.g., magnetic cassettes, digital video disks, flash memory cards, ZIP cartridges, JAZZ cartridges, etc., also may be used in the exemplary operating environment.

In addition, the PC 50 may include a serial port interface 88 connected to the system bus 54. The serial port interface 88 connects to input devices that allow commands and information to be entered. These input devices may include a keyboard 90, a mouse 92, and/or other input device. Pens, touch-operated devices, microphones, joysticks, game pads, satellite dishes, scanners, etc. also may be used to enter commands and/or information. The input devices also may be connected by other interfaces, such as a game port or a universal serial bus (USB). Further, the PC 50 may include a monitor or other display screen 96. The monitor 96 is connected through an interface such as a video adaptor 98 to the system bus 54. The PC 50 may include other peripheral and/or output devices, such as speakers or printers (not illustrated).

The PC 50 may be connected to one or more remote computers (not shown), and may operate in a network environment. The remote computer may be a PC, a server, a router, a peer device or other common network node, and may include many or all of the elements described in relation to the PC 50. The connection between the PC 50 and the remote computer may be through a local area network (LAN) and/or a wide area network (WAN). The PC 50 is connected to the LAN through a network interface. With respect to the WAN, the PC 50 may include a modem or other device to channel communications over the WAN, or global data communications network (e.g., the Internet). The modem (internal or external) is connected to the system bus 54 via the serial port interface 88. The described network connections are exemplary and other ways of establishing a communications link between the PC 50 and a remote computer may be used.

According to an exemplary data collection method, tool 100, with clamping arm 102 retracted, is lowered to the bottom of borehole 110 (or the lowest depth z of interest), arm 102 is extended to clamp geophone 104 in good acoustic contact with a wall of borehole 110, and a seismic signal is generated at source 114. The seismic energy measured by the geophone 104 is digitized and sent up to surface unit 122 for preprocessing. For example, preprocessing can include adjusting the data to account for tool 100 orientation and seismic energy attenuation with travel time. Preprocessing can also include subjecting the data to other processing of VSP signals to generate a VSP seismogram in discrete form.

The VSP seismogram generated by tool 100 of FIG. 1 is designated $D_i(t_j)$. In this designation, each subscript "i" identifies a respective one of a total of I seismic traces $D_i(t_j)$, where i=1, 2, . . . , I and I is an integer. In the same notation, the subscript "j" identifies a time sample $t_j$ of seismic trace $D_i(t_j)$ and j=1, 2, . . . , J where J is an integer. VSP seismogram $D_i(t_j)$ can be conceptualized as a matrix of time samples of seismic amplitude, where each row is a seismic trace for one spatial position, depth $z_i$, and each column is the set of samples for the same time $t_j$ in all of seismic traces $D_i(t_j)$. VSP seismogram $D_i(t_j)$ is stored in digital computer storage at a step 126 of an exemplary processing method 125.

According to the processing method 125 performed by the surface unit 122, in order to allow for convenient and effective filtering and/or other processing of time-depth seismogram $D_i(t_j)$ in tau-p space, time-depth seismogram $D_i(t_j)$ is subjected to a direct forward tau-p transformation at a step 128. The transformation is discrete but most of the energy, particularly the signal, can be recovered by the reverse transformation. The forward tau-p transformation is achieved with transformation matrices $R_{in}$ that are derived at a step 130, as described in further detail below. The subscript "n" identifies a respective one of a total of N columns in each transform matrix $R_{in}$, where a given column pertains to a given slope $p_n$ in tau-p space, where n=1, 2, . . . , N and N is an integer.

The output of the step 128 is a tau-p seismogram $A_n(\tau_j)$ that is in tau-p (slope-intercept) space. If desired, tau-p seismogram $A_n(\tau_j)$ can be stored and/or otherwise utilized at a step 132. At a step 134, tau-p seismogram $A_n(\tau_j)$ can be subjected to filtering and/or other processing for example, deconvolution to suppress multiples, up-down separation, other undesirable effects based on large apparent dips, and mode decomposition into compressional and shear waves using multicomponent seismic data. The resulting filtered or processed tau-p seismogram $A_n(\tau_j)$ can be displayed, recorded, and/or otherwise utilized at step 136. Processed tau-p seismogram $A_n(\tau_j)$ can be reverse or inverse transformed at a step 138, for example, to return to the time-depth space of time-depth seismogram $D_i(t_j)$ using transformation matrices $R_{in}$ from step 130. The output of step 138 is a processed time-depth seismogram $D_i(t_j)$ that can be displayed, stored, or otherwise utilized at a step 142 to help evaluate subsurface formation 112 for underground resources.

Surface Seismics

Figure 2:
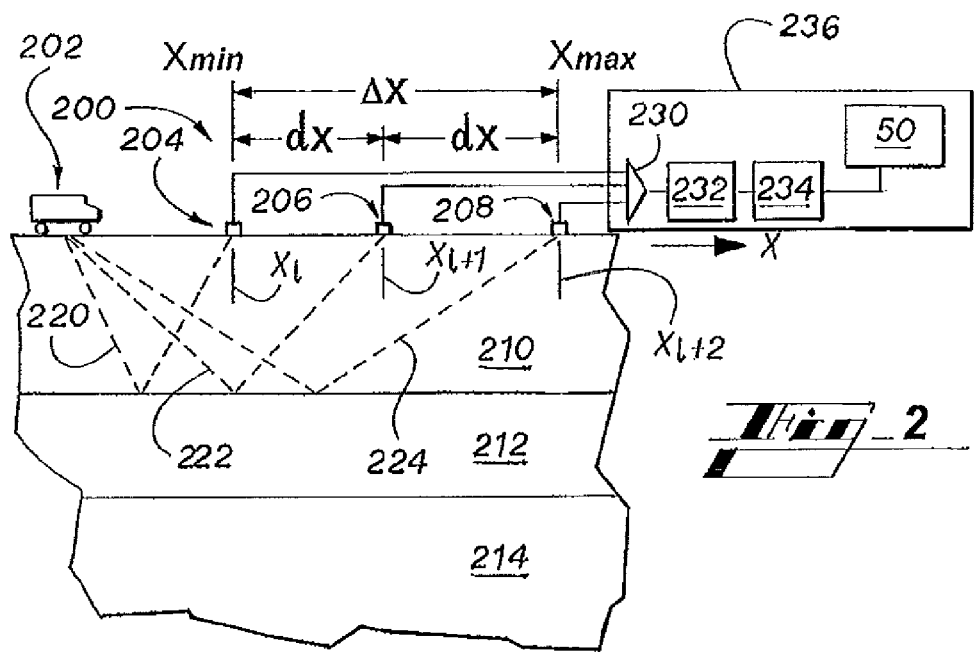
FIG. 2 is a schematic illustration of an apparatus for measuring surface seismics, according to a second exemplary embodiment.

FIG. 2 illustrates a second apparatus 200 that is configured to measure surface seismics. Apparatus 200 includes a source 202 of seismic energy and receivers or geophones 204, 206, 208. Source 202 is located on the earth's surface and is illustrated as a truck that uses a vibrator to impart mechanical vibrations to the earth. Source 202 creates a wave of seismic energy that travels downwardly into formations 210, 212, 214. For purposes of teaching, several raypaths of a wave of seismic energy are illustrated. Raypath 220 propagates downwardly to the interface between formations 210, 212 and returns back to the surface (a primary reflection) where it is received at geophone 204. Similarly, each of raypaths 222, 224 propagates downwardly to the same reflector and is received at respective geophone 206, 208 (primary reflections). Each of the raypaths 220, 222, 224 is received at a different angle of incidence. Non-illustrated raypaths are reflected by the interface between formations 212, 214 and received at geophones 204, 206, 208 as primary reflections. In addition, non-illustrated raypaths are reflected multiple times by one or more interfaces between formations 210, 212, 214 (multiple reflections) and are received at geophones 204, 206, 208. For simplicity, the refractions of the raypaths as they go from one layer into another are not illustrated.

A surface unit 236 acquires, processes, and stores the signals or traces that are output by the geophones 204, 206, 208. The illustrated surface unit 236 includes an amplifier 230, a filter 232, a digitizer 234, and the PC 50 described with respect to the surface unit 122. After a suitable number of seismic energy impulses have been imparted to the earth at a particular location and recorded by geophones 204, 206, 208, energy source 202 is moved to a new location along a line connecting the source 202 and geophone 204, 206, 208 positions. Geophones 204, 206, 208 can also be moved to a respective new location along the same line. The process can be repeated to get multifold coverage of the subsurface formations 210, 212, 214.

Surface unit 236 can collect and process a time-offset seismogram $D_i(t_j)$ that is similar to the seismogram $D_i(t_j)$ discussed in connection with method 125 and FIG. 1. Here, referring momentarily to FIGS. 3, 5, and 10, the time-offset seismogram $D_i(t_j)$ can be conceptualized as a matrix of time samples of seismic amplitude, where each row is a seismic trace for one spatial position $x_i$ corresponding to a geophone 204, 206, 208 and each column is the set of samples for the same time $t_j$ in all of seismic traces $D_i(t_j)$. In general, seismograms can be in the more conventional time-offset space, time-distance space, time-lateral space, time-depth space, frequency-offset space, or any other suitable space.

Similar to the manner in which the seismogram is processed by the surface unit 122 according to the method 125, the seismogram $D_i(t_j)$ is processed by surface unit 236 to effect forward transformation, filtering, inverse transformation, and utilization of the result so as to process time-offset seismogram $D_i(t_j)$ for use in evaluating underground resources or features of the formations 210, 212, 214. For this kind of data, as discussed in further detail below, typical filtering operations would be muting of large p values to attenuate surface waves (such as ground roll), and applying deconvolution filters to attenuate short period multiple reflections. Other known filtering operations include those discussed in *Seismic Data Analysis: Processing, Inversion, and Interpretation of Seismic Data* by Ozdogan Yilmaz (vol. I & II, Society of Exploration Geophysicists, 2001).

Processing Method

FIGS. 3-5 illustrate an exemplary method of processing time-offset seismogram $D_i(t_j)$ corresponding to the surface seismic data collection method illustrated in FIG. 2. FIG. 3 illustrates time-offset seismogram $D_i(t_j)$ in time-offset space as would be produced by surface unit 236 of the second apparatus 200 illustrated in FIG. 2. For purposes of teaching, time-offset seismogram $D_i(t_j)$ of FIG. 3 is illustrated in a simplified manner to show the relevant features. In practice, seismograms tend to be much more complex and the desired features tend to be much more obscured by undesirable features such as surface waves, multiples, and other noise. In FIG. 3, the horizontal axis is the travel time $t_j$ taken by a seismic signal to travel from source 202 to a geophone 204, 206, 208 at an offset position $x_i$ and the vertical axis is offset distance $x_i$ along the surface of the subsurface formation.

For clarity, time-offset seismogram $D_i(t_j)$ of FIG. 3 is represented in continuous form. In practice, each trace is made up of discrete time samples $t_j$, each row of time-offset seismogram $D_i(t_j)$ being a trace for a given position $x_i$. The values of elements of time-offset seismogram $D_i(t_j)$ are depicted in FIG. 3 as raised amplitudes.

In the simplified plot of FIG. 3, there is a surface wave event 300 and a primary reflection event 302. In the illustrated example, the surface wave event 300 is substantially linear and the primary reflection event 302 is substantially curved. According to an exemplary method of processing, surface wave event 300 is separated from the primary reflection event 302. It is difficult to effectively achieve this separation in time-offset space because, in a typical real world seismogram, the complexity of the subsurface structures and imperfections of the measuring process can make it impossible or impractical to achieve the separation accurately. However, the separation can be done effectively, conveniently, and accurately in tau-p space. FIG. 4 illustrates time-offset seismogram $D_i(t_j)$ of FIG. 3 when transformed into tau-p seismogram $A_n(\tau_j)$ in linear tau-p space. The horizontal axis is the tau-axis (intercept τ) and the vertical axis is the p-axis (slope p).

One important characteristic of tau-p seismogram $A_n(\tau_j)$ represented in tau-p space is that the energy of surface wave event 300 appears at a large p-value of the p-dimension and that the energy of primary reflection event 302 appears at p-values that are generally below the p-value of the surface wave event 300. Further, the energy of surface wave event 300 is associated with a slope $p_1$ and an intercept $\tau_1$. As such, tau-p seismogram $A_n(\tau_j)$ can be filtered to remove surface wave event 300 by removing all, or a selected part, of the energy that appears at large p-values and/or is associated with slope $p_1$ and an intercept $\tau_1$. For example, energy within a window 400 can be removed specifically for the purpose of removing surface wave event 300. Illustrated window 400 is selected to include the surface wave event 300.

FIG. 5 illustrates the result of an inverse transformation of tau-p seismogram $A_n(\tau_j)$ of FIG. 4 after removing energy within window 400. The processed time-offset seismogram $D_i(t_j)$ is in the same space as the original time-offset seismogram $D_i(t_j)$ of FIG. 3. Surface wave event 300 has been suppressed leaving primary reflection event 302 of the original time-offset seismogram $D_i(t_j)$.

FIG. 3 illustrates a simplistic example in which it is clear that event 300 is a surface wave event. However, the method of filtering is applicable to a more complex environment. The technique of forward transforming from a first space into a second space in a manner that allows exact inverse transformation back to the first space is applicable to other kinds of spaces and to other kinds of filtering in the second space. Also, the method can be used with data other than seismograms.

Tau-p Transform

FIGS. 6-8 illustrate the nature of tau-p transformations in their simplest form. FIG. 6 illustrates time-offset seismogram $D_i(t_j)$ represented in time-offset space and FIG. 7 shows the corresponding tau-p seismogram $A_n(\tau_j)$ represented in tau-p space. FIG. 6 corresponds to FIG. 3 and FIG. 7 corresponds to FIG. 4. In the continuous form of the tau-p transformation, the integral along a line in time-depth space becomes a point in tau-p space. The integral along line 600a in FIG. 6 becomes a point 600b in FIG. 7. The integral along a line 602a in FIG. 6, which has the same slope p as line 600a, becomes a point 602b in FIG. 7 and has the same slope p as point 600b. Integrals along parallel lines 604a, 606a become points 604b, 606b that have the same slope p value. The term integral in this context is used to mean the integral of the energy that appears in the seismogram represented in FIG. 6 along the respective line.

The inverse transformation from tau-p space to time-offset space is illustrated in FIG. 8 and includes choosing a point 608c in the time-offset space that happens to have the same location in time-offset space as point 608a in FIG. 6 and accumulating the contribution to this point from each of the points in FIG. 7 that pass through point 608a. For simplicity, point 608c was chosen at the intersection of lines 600c, 604c and the reconstructed point 608c receives and accumulates contributions from points 600b, 604b in FIG. 7. Point 604b also makes contributions to all points in FIG. 8 that are along line 604c. If FIGS. 6 and 8 are superimposed, line 600a would coincide with line 600c and line 604a would coincide with line 604c. The inverse transformation from a representation such as FIG. 7 to a representation such as FIG. 8 is sometimes called back projection and the transformation from a representation such as FIG. 6 to a representation such as FIG. 7 is sometimes called a forward projection.

A specific and nonlimiting method for transforming to tau-p space from time-offset space is now described in detail. The exemplary method includes obtaining a two dimensional array of values of a seismic parameter such as time-offset seismogram $D_i(t_j)$, transforming time-offset seismogram $D_i(t_j)$ into frequency space to get frequency-offset seismogram $D_i(\omega_j)$, transforming frequency-offset seismogram $D_i(\omega_j)$ into ω-p space to get frequency-domain tau-p seismogram $A_n(\omega_j)$, and then transforming the frequency ω back to intercept time τ to get tau-p seismogram $A_n(\tau_j)$. At least part of the transformation involves transformation matrices $R_{in}$ that can be derived as discussed in further detail below.

The tau-p seismogram $A_n(\tau_j)$ is in discrete form with the subscript n identifying respective rows of the array and the indices j identifying respective columns of the array. In this form of tau-p seismogram $A_n(\tau_j)$, the subscript n represents slope $p_n$ and the index j represents intercept tau τ. Here, each intercept tau $\tau_j$ is time $t_j$ although the intercept can be in frequency domain or another space as illustrated by frequency-domain tau-p seismogram $A_n(\omega_j)$.

Tau-p deconvolution or a tau-p transform can be achieved with a least squares inversion method including fitting frequency domain data such as frequency-offset seismogram $D_i(\omega_j)$ to a tau-p model such as frequency-domain tau-p seismogram $A_n(\omega_j)$. The inversion method is advantageous with respect to discretization of the continuous transform because it can handle irregularly spaced data, and it better handles the edges of the data (where the continuous version tries to fit a function which sharply transitions to zero at the edges). The least squares problem is $$\sum_i \left| \left( \sum_n A_n(\omega_j) e^{i\omega_j p_n x_i} \right) - D_i(\omega_j) \right|^2 = \min.$$

The normal equations are then $$\sum_n \sum_i A_n(\omega_j) e^{i\omega_j(p_n - p_m)x_i} = \sum_i D_i(\omega_j) e^{-i\omega_j p_m x_i}$$

where m=1, 2, ..., M and M is an integer. Subscript "m" is the same as subscript "n", but is referenced differently to distinguish transformation matrix $R_{in}$ from adjoint transformation matrix $R_{in}^+$ that is given as adjoint transformation matrix $R_{mi}$. The normal equations can be written in matrix form as $(R^+R)A = R^+D$ where the elements of transformation matrix $R_{in}$ are given by $R_{in} = e^{i\omega_j p_n x_i}$ and the elements of adjoint transformation matrix $R_{mi}$ are given by $R_{mi} = e^{-i\omega_j p_m x_i}$.

The algebraic solution of the normal equations gives the frequency-p seismogram $A_n(\omega_j)$ for a frequency $\omega_j$ and can be written as $$A = (R^+R)^{-1} R^+ D.$$

The frequency-p seismograms $A_n(\omega_j)$ are then inverse Fourier transformed to give the tau-p seismogram for each frequency $\omega_j$ that are combined in tau-p seismogram $A_n(\tau_j)$ for a range of times $\tau_j$. The matrix $R^+R$ is hereinafter referred to as combined transformation matrix $S_{mn}$.

Stability and Noise Factor

To stabilize or constrain the solution for frequency-domain tau-p seismogram $A_n(\omega_j)$ or otherwise provide that combined transformation matrix $S_{mn}$ can be inverted, a frequency dependent noise factor $\epsilon_2$ is added to each of the elements of or otherwise combined with combined transformation matrix $S_{mn}$ to create an invertible combined transformation matrix $X_{mn}$. In general, the frequency dependent noise factor $\epsilon_2$ stabilizes the solution for frequency-domain tau-p seismogram $A_n(\omega_j)$ by limiting the contributions of the small eigenvalues of the combined transformation matrix $S_{mn}$.

For purposes of teaching, a frequency independent noise factor $\epsilon_1$ and the frequency dependent noise factor $\epsilon_2$ are described. The frequency independent noise factor $\epsilon_1$ can be developed as a function of the average diagonal element of combined transformation matrix $S_{mn}$ according to $$\varepsilon_1 = \frac{F}{Y_p} \sum_\alpha S_{\alpha\alpha}$$

where $Y_p$ is the number of eigenvalues ($Y_p=M$) and F is the fraction of the average diagonal element to add as noise. For example, F can be one percent of the average diagonal element or 0.01. Since for a Hermitian matrix the average diagonal element is equal to the average eigenvalue, frequency independent noise factor $\epsilon_1$ can create a floor such that all the eigenvalues are greater than zero. However, where frequency independent noise factor $\epsilon_1$ is developed in this manner, a large number of zero-value eigenvalues can significantly reduce the value of frequency independent noise factor $\epsilon_1$ to the point where frequency independent noise factor $\epsilon_1$ fails to stabilize the solution for frequency-domain tau-p seismogram $A_n(\omega_j)$ even though the eigenvalues are non-zero. It has been observed that the number of zero-value eigenvalues increases at lower frequencies $\omega_j$ and, accordingly, the solutions for frequency-domain tau-p seismogram $A_n(\omega_j)$ at lower frequencies $\omega_j$ can be difficult to stabilize with frequency independent noise factor $\epsilon_1$ as it is simply a function of the average diagonal element of combined transformation matrix $S_{mn}$.

To stabilize combined transformation matrix $S_{mn}$ even at low frequencies $\omega_j$, the frequency dependent noise factor $\epsilon_2$ can be used and is given by $$\varepsilon_2 = \frac{F}{fdp\Delta x Y_p} \sum_\alpha S_{\alpha\alpha}.$$

Here, a number of non-zero eigenvalues $Y_{p,nonzero}$ is given by the denominator $Y_{p,nonzero}(f_j) = f_j\, dp\, \Delta x\, Y_p$ and a value F is the frequency-independent fraction of the average non-zero diagonal element to add to combined transformation matrix $S_{mn}$ as noise. Adding frequency dependent noise factor $\epsilon_2$ to combined transformation matrix $S_{mn}$ creates invertible combined transformation matrix $X_{mn}$. Here, frequency f is given in units of Hertz instead of radians per second. Frequency f, $\omega$ can be given in either form as $f=\omega/(2*pi)$ and $\omega=2*pi*f$. As above, the value F can be 0.01 or one percent.

As frequency dependent noise factor $\epsilon_2$ is a function of the average of the non-zero diagonal elements or eigenvalues of combined transformation matrix $S_{mn}$, it is not substantially affected by an increase in the number of non-zero eigenvalues $Y_{p,nonzero}$ at lower frequencies $\omega_j$. Frequency dependent noise factor $\epsilon_2$ is a function of frequency $f_j$ as the number of non-zero eigenvalues $Y_{p,nonzero}$ is a function of frequency $f_j$. As such, frequency dependent noise factor $\epsilon_2$ stabilizes the solutions for frequency-domain tau-p seismogram $A_n(\omega_j)$ even at lower frequencies $f_j$. The solutions for frequency-domain tau-p seismogram $A_n(\omega_j)$ can be given by $$A = (X)^{-1} R^+ D$$

The inverse transform is a straight sum of plane waves given by $D=RA$.

Frequency dependent noise factor $\epsilon_2$ stabilizes combined transformation matrix $S_{mn}$, for example, by establishing a lowest value of an eigenvalue for combined transformation matrix $S_{mn}$. This constrains the least squares fit where combined transformation matrix $S_{mn}$ has a null space or zero-value eigenvalues.

Estimate of Number of Nonzero Eigenvalues

The development of the function for determining the number of non-zero eigenvalues $Y_{p,nonzero}$ is now described. Referring to FIGS. 10-11, in the wavenumber-frequency (kf) domain, the slope (p) sampling interval dp can be determined according to largest frequency $f_{max}$ and range of positions $\Delta x$ between the minimum and maximum positions of the geophones 204, 208. Such a p-sampling interval dp is adequate at largest frequency $f_{max}$ and oversamples the kf domain at lower frequencies $f_j$.

Referring to FIG. 12, for purposes of teaching, in contrast to the period in the spatial domain provided by range of positions $\Delta x$, a period L is introduced that can be derived as follows. A wavenumber (k) domain sampling interval dk produces the period L in the spatial domain as $L=1/dk$. The relationship between the p-domain and the k-domain is given as $k=p*f$ such that, a p-domain sampling interval dp produces period L in the spatial domain as $L=1/(f_j*dp)$. Here, period L is a function of frequency $f_j$.

When frequency $f_j$ is largest frequency $f_{max}$, spatial period L is substantially equal to range of positions $\Delta x$ as $L=\Delta x=1/(f_{max}*dp(f_{max}))$. As mentioned above, dp is fixed according to largest frequency $f_{max}$. For smaller frequencies $f_j$, period L becomes large with respect to range of positions $\Delta x$ and includes a null space outside of the model space of range of positions $\Delta x$. As such, the solution for frequency-domain tau-p seismogram $A_n(\omega_j)$ may not be constrained to the data for range of positions $\Delta x$ but may correspond to the null space. As an example, a wavelet v is illustrated that is zero at the data locations for range of positions $\Delta x$ but is within spatial period L. Wavelet v has energy in the p-domain, but doesn't affect the fit to the data of time-depth seismogram $D_i(t_j)$.

For a given frequency $f_j$, the ratio of the number of non-zero diagonal elements or eigenvalues $Y_{p,nonzero}$ to the number of eigenvalues $Y_p$ is substantially the same as the ratio of the size of range of positions $\Delta x$ to the size of period L. This can be given as $$\frac{Y_{p,nonzero}}{Y_p} = \frac{\Delta x}{L}.$$

Since $L=1/(f*dp)$, the number of non-zero eigenvalues $Y_{p,nonzero}$ is then $$Y_{p,nonzero} = Y_p \frac{\Delta x}{L} = Y_p f dp \Delta x$$

as seen above in the equation for frequency dependent noise factor $\epsilon_2$. Alternatively, the ratio of the number of non-zero diagonal elements or eigenvalues $Y_{p,nonzero}$ relative to the number of eigenvalues $Y_p$ is substantially the same as the ratio of frequency $f_j$ to largest frequency $f_{max}$.

Curved Event

In an example described above, the linear version of the tau-p transform is useful for removing the surface wave event 300 since it is a substantially linear event. However, since the primary reflection event 302 and other multiples are curved events, a use of curved lines (curves) rather than straight lines (slopes) is appropriate for additionally filtering and processing seismogram $D_i(t_j)$. In general, curved lines are appropriate if the features of the greatest interest in the original seismogram happen to be along curved rather than straight lines. There is a need to vary the noise factors with frequency in this case just as in the linear case.

When plane waves are used to build a curved event such as primary reflection event 302, the input wavelets are related to the output wavelets by the square root of a derivative operator sqrt(iω), which comes in from the stationary phase integration. Using the formulation above, there is a difference between the tau-p domain and the time-offset domain of substantially 3 db/octave. This is undesirable for deconvolution in the tau-p domain. Specifically deconvolution is a least-squares operation. The derivation of the deconvolution filter on the unbalanced spectrum described above gives relatively too little weight to the low frequencies, leading to some artifacts. When these low frequency artifacts are boosted by the inverse transformation, they become more objectionable. To account for this difference, the output of the forward transform, frequency-domain tau-p seismogram $A_n(\omega_j)$, is multiplied by the square root of a derivative operator sqrt(iω) to get a curved frequency-domain tau-p seismogram $C_n(\omega_j)$ given by $C_n(\omega_j)=A_n(\omega_j)\sqrt{i\omega}$. The sqrt(iω) factor in the transform definition preserves the spectrum and phase of the wavelet. Curved frequency-domain tau-p seismogram $C_n(\omega_j)$ can then be subjected to filtering, processing, or deconvolution. Before an inverse transform is applied to transform a seismogram from tau-p space to k-f space, curved frequency-domain tau-p seismogram $C_n(\omega_j)$ is divided by the square root of the derivative operator sqrt(iω) to get linear frequency-domain tau-p seismogram $A_n(\omega_j)$. The inverse transform is then applied to linear frequency-domain tau-p seismogram $A_n(\omega_j)$ as described above.

The processing methods described herein with respect to the data collected by the apparatus 200 of FIG. 2 can similarly be applied to the data collected by the apparatus 99 of FIG. 1 where data is collected at depths z instead of surface positions x.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

The invention claimed is:

1. A method for analyzing seismic data collected with one or more sensors at a plurality of sensor positions in a range along a dimension of a formation, the method comprising operating a processor to transform seismic data D into tau-p space, the seismic data D representing the formation, said transforming comprising:

for each frequency:
generating frequency dependent transformation matrices R that are configured to transform frequency-offset seismic data D into frequency-domain tau-p seismic data A according to $A=(R^+R)^{-1}R^+D$;
generating an estimate of the number of nonzero eigenvalues of the transformation matrix $R^+R$, the number of nonzero eigenvalues being a function of frequency;
creating a transformation matrix X by combining a noise factor and the transformation matrix $R^+R$, the noise factor being a function of the number of nonzero eigenvalues;
transforming the frequency-offset seismic data D into frequency-domain tau-p seismic data A according to $A=(X)^{-1}R^+D$; and
outputting a tau-p seismogram indicative of frequency-domain tau-p seismic data A.

2. The method of claim 1, wherein the frequency-domain tau-p seismic data A is multiplied by the square root of a derivative operator.

3. The method of claim 1, wherein the seismic data D is collected at sensor positions located in a range along a dimension of the formation.

4. The method of claim 3, wherein the sensor positions are located in a range along the surface of the formation.

5. The method of claim 3, wherein the sensor positions are located in a range along the depth of the formation.

6. The method of claim 3, wherein the number of nonzero eigenvalues is a function of the range of sensor positions.

7. The method of claim 1, wherein the number of nonzero eigenvalues is a function of a p-domain sampling interval.

8. The method of claim 1, wherein the noise factor is a function of the sum of the eigenvalues of transformation matrix $R^+R$ divided by the number of nonzero eigenvalues.

9. The method of claim 1, wherein the noise factor is substantially proportional to the average of the nonzero eigenvalues of transformation matrix $R^+R$.

10. An apparatus for analyzing seismic data collected with one or more sensors at a plurality of sensor positions in a range along a dimension of a formation, comprising:

a processor configured to transform seismic data D into tau-p space according to a transformation method, the transformation method comprising:
for each frequency:
generating frequency dependent transformation matrices R that are configured to transform the frequency-offset seismic data D into frequency-domain tau-p seismic data A according to $A=(R^+R)^{-1}R^+D$;
generating an estimate of the number of nonzero eigenvalues of the transformation matrix $R^+R$, the number of nonzero eigenvalues being a function of frequency;
creating a transformation matrix X by combining a noise factor and the transformation matrix $R^+R$, the noise factor being a function of the number of nonzero eigenvalues;
transforming the frequency-offset seismic data D into frequency-domain tau-p seismic data A according to $A=(X)^{-1}R^+D$; and
outputting a tau-p seismogram indicative of frequency-domain tau-p seismic data A.

11. The apparatus of claim 10, wherein the number of nonzero eigenvalues is a function of the range of sensor positions.

12. The apparatus of claim 11, wherein the number of nonzero eigenvalues is a function of a p-domain sampling interval.

13. The apparatus of claim 10, wherein the noise factor is a function of the sum of the eigenvalues of transformation matrix $R^+R$ divided by the number of nonzero eigenvalues.

14. The apparatus of claim 10, wherein the sensor positions are in a range along the surface of the formation.

15. The apparatus of claim 10, wherein the sensor positions are in a range along the depth of the formation.

* * * * *